(12) United States Patent
Smith

(10) Patent No.: US 7,035,731 B2
(45) Date of Patent: Apr. 25, 2006

(54) THRESHOLD-BASED SERVICE NOTIFICATION SYSTEM AND METHOD

(75) Inventor: Dwight R. Smith, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 121 days.

(21) Appl. No.: 10/331,379

(22) Filed: Dec. 30, 2002

(65) Prior Publication Data

US 2004/0128067 A1 Jul. 1, 2004

(51) Int. Cl.
G06F 15/50 (2006.01)

(52) U.S. Cl. .................. 701/207; 701/202; 701/213; 340/995.24

(58) Field of Classification Search ......... 701/200–202, 701/207–210, 213; 340/988, 995.1, 995.24, 340/995.16, 995.19, 995.13; 342/457; 705/5, 705/13, 14, 26
See application file for complete search history.

(56) References Cited

U.S. PATENT DOCUMENTS

| | | | | |
|---|---|---|---|---|
| 5,229,947 A | * | 7/1993 | Ross et al. | 701/200 |
| 5,568,390 A | * | 10/1996 | Hirota et al. | 701/201 |
| 5,790,973 A | * | 8/1998 | Blaker et al. | 455/456.5 |
| 5,859,628 A | * | 1/1999 | Ross et al. | 345/173 |
| 5,911,773 A | * | 6/1999 | Mutsuga et al. | 701/200 |
| 6,028,537 A | * | 2/2000 | Suman et al. | 340/988 |
| 6,411,891 B1 | * | 6/2002 | Jones | 701/201 |
| 6,414,635 B1 | * | 7/2002 | Stewart et al. | 342/457 |
| 6,434,482 B1 | * | 8/2002 | Oshida et al. | 701/209 |
| 6,564,143 B1 | * | 5/2003 | Alewine et al. | 701/207 |
| 2003/0036848 A1 | * | 2/2003 | Sheha et al. | 701/209 |

* cited by examiner

Primary Examiner—Thomas G. Black
Assistant Examiner—Eric M. Gibson
(74) Attorney, Agent, or Firm—Lawrence J. Chapa

(57) ABSTRACT

A notification server (100) is coupled to a database (102). The database (102) includes information relating to a user service and a threshold for notifying the user of the availability of the service. The threshold is based upon a then current location of the user and an availability of the service relative to the then current location of the user. The notification server (100) is operable to generate an alert based upon the user service, the then current location of the user and the threshold and to communicate the alert to the user via a communication interface (104).

20 Claims, 3 Drawing Sheets

THRESHOLD-BASED SERVICE NOTIFICATION SYSTEM AND METHOD

TECHNICAL FIELD

This patent relates to mobile communication systems and mobile commerce (m-commerce) and particularly to a threshold based method and apparatus for notifying a user of a service given the location of the user and the service desired.

BACKGROUND

Applications exist, particularly in the field of automotive telematics, to inform a user of a mobile communication system of various services offered within a particular range of the user. That is, for example, say a user is driving through a town and is interested in a particular type of restaurant. The user may initiate a query through a cellular telephone provider or via an on-board navigation or driver assist service for the service to locate restaurants of the desired type relative to the location of the user. The system may respond by voice, text or email message, graphic message, and the like identifying the availability of the service the user desires in the area, such as the locations of restaurants of the desired type.

Additional telematics and telematics-like applications exist to notify a vehicle user of the condition of the vehicle. For example, the vehicle may need periodic maintenance based upon mileage. The vehicle management and control system may signal that it is time for the maintenance, and a message may be generated and communicated to the user. For example, the message may be an indicator within the vehicle. However, with the integration of communication technologies within the vehicle it is possible that the vehicle can provide an email notification, a page or similar indication to the user that service is required. Via integration with a navigation system, the user may be further informed of the locations of various service facilities capable of providing the required service.

Often these notifications are provided in conjunction with a preset or user defined threshold. For example, the vehicle may be configured to notify the user whenever there is less than two gallons of gasoline left within the vehicle. The user could also set a threshold to request to be notified when they are within a certain distance of a destination, for example if they are riding on a train and do not want to miss their stop. In certain situations, such as the case with being notified as to the amount of gas remaining in the tank, these notifications may come too late. For example, if the user is notified of having two gallons of gasoline remaining, but the nearest service station is farther away than two gallons will allow the user to travel, then the information has arrived too late to be useful.

Thus, there is a need for a system and method to coordinate service notifications based on locations to enhance the usefulness of the notification.

BRIEF DESCRIPTION OF THE DRAWINGS

This disclosure will describe several embodiments to illustrate its broad teachings. Reference is also made to the attached drawings.

DETAILED DESCRIPTION

Although the following text sets forth a detailed description of numerous different embodiments of the patent, it should be understood that the legal scope of the patent is defined by the words of the claims set forth at the end of this patent. The detailed description is to be construed as exemplary only and does not describe every possible embodiment of the patent because describing every possible embodiment would be impractical, if not impossible. Numerous alternative embodiments could be implemented, using either current technology or technology developed after the filing date of this patent, which would still fall within the scope of the claims defining the patent.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

To improve the value of notification information, the time and location of the notification may be based upon a dynamic threshold. The threshold value may take into account the location of the user or device as well as the locations for the available suppliers of the desired/required services.

Figure 1:
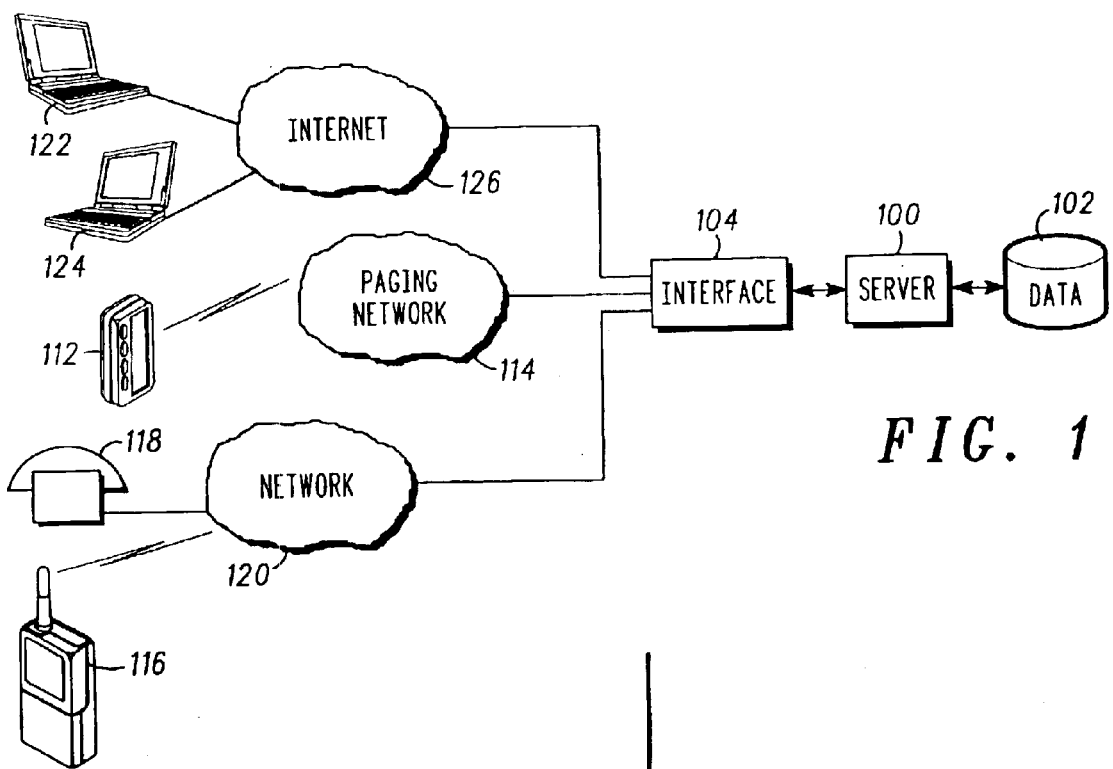
FIG. 1 is a block diagram of a system adapted for service distribution based upon threshold levels.

Referring to FIG. 1, a notification server 100 is coupled to a database 102 containing a directory of services and locations. The database may contain information relating to what services are provided by particular facilities, the hours of operations of the facilities and any potential restrictions on the services available at the facility. The database 102 may be supplemented by or replaced by the Internet and an associated search engine. By adapting the database 102 to utilize the searchable Internet, the notification server 100 may obtain and deliver to the user various media content and advertising. Delivery of such content may be responsive to a set of user defined criteria for filtering what content is delivered and under what conditions the content is delivered.

In connection with the set of user defined criteria, the database 102 may contain information about the user such as destination information, appointment information, preferences and the like. This user information is accessible by the notification server 100. If, for example, the user is traveling ahead of schedule relative to intended destination and calendar information, the notification server 100 may obtain from the database 102 and/or the Internet information that the user may desire to receive. Such information may include locations of favorite restaurant types, points of interest, etc and advertisement information targeted thereto. The notification server 100 may further be adapted to learn user likes and dislikes and retain such information in the database 102 for later usage. The particular type of software routine designed to learn user preferences is not an essential element of the invention, and many types are currently commercially employed.

The notification server 100 is further coupled to a communication interface 104 for communicating notifications to users. The communication interface may couple to wireless and landline telephone and data services 106 and 108, respectively or data services such as wireless and landline packet data services including the Internet 110. In this manner, the notification server 100 may provide a notification to the user by sending a page to pager 112 via a paging network 114, providing a telephone call to a cellular or landline telephone 114 or 116, respectively, via a wireless or landline telephone network collectively identified as network 120, leaving a voice message via the cellular or landline telephone network 120, providing an email to an email recipient 122 or instant message to a workstation 124 via the Internet or otherwise communicating the notification to the user.

The user registers with the notification server 100. This registration may take place via an Internet connection, a call in system, wireless data transfer, in-person, mail-in or any other suitable method for allowing the user to communicate to the notification server 100 the types of services the user is interested in as well as desired threshold values associated with such services. This user information is maintained within the database 102. or any other suitable memory location accessible by the notification server 100 in a user profile. The notification server 100 may further be adapted to query the user's vehicle to obtain maintenance and operating data via wireless data transmission. In connection with obtaining this type of data, i.e., data for which the user may not set a specific threshold, the notification server 100 may employ a listing of default threshold values or calculate dynamic threshold values. This concept will be explained further in connection with the discussion associated with FIGS. 4 and 5 below.

The notification server 100 may further be adapted with predictive capability. That is, the notification server 100 may adaptively add notifications to the user profile based upon existing user profile information. For example, if the user profile indicates the user prefers particular types of restaurants, the notification server 100 may determine other restaurant types the user may be interested in and provide notifications to the user regarding such additional restaurant types at appropriate times, e.g., when their location and the time of day suggests it is appropriate. Such predicative cross marketing tools are well known in the field of Internet commerce, and such predictive cross marketing strategies may be employed here. Of course, the user may be offered the option to disable such additional notification services.

Figure 2:
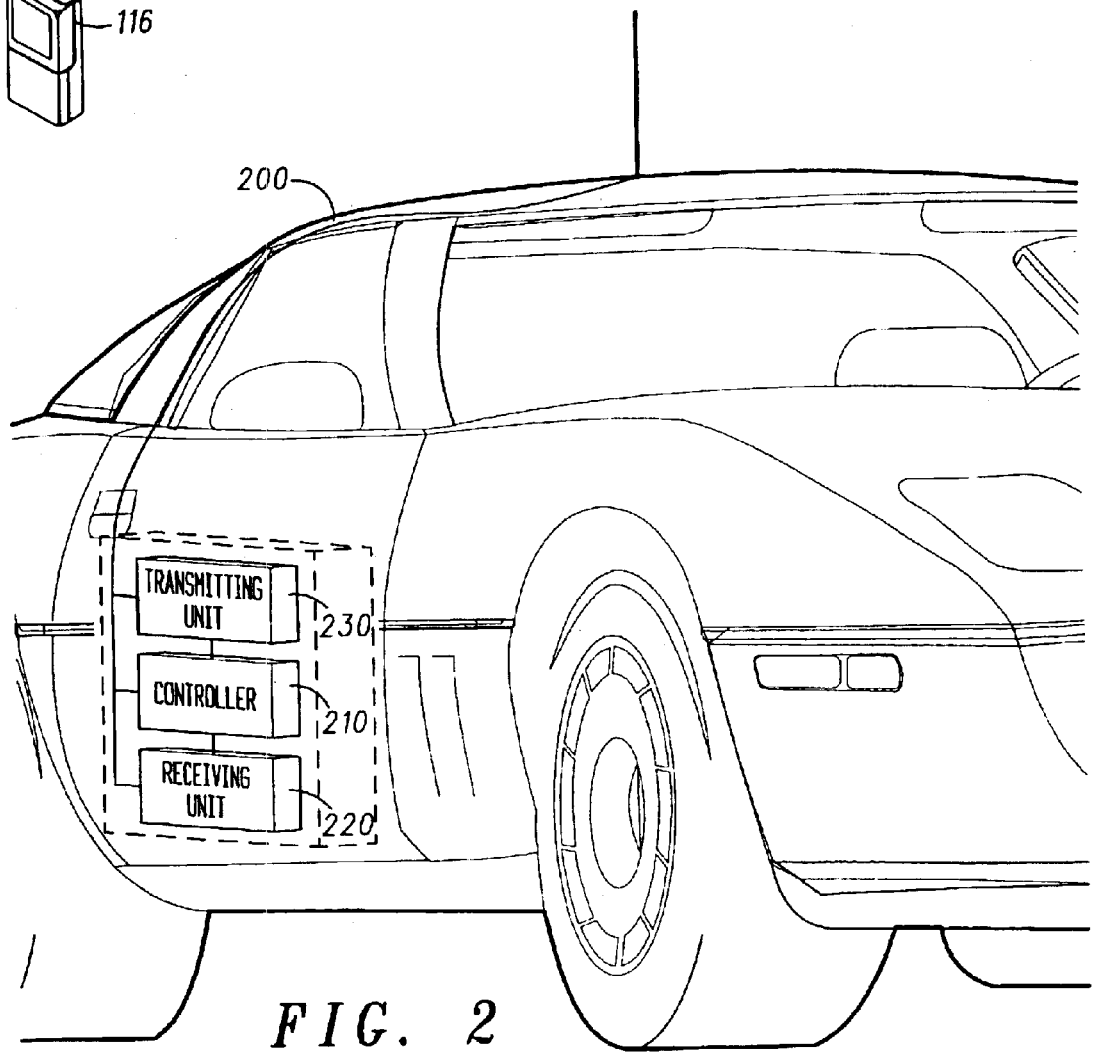
FIG. 2. is a block diagram of a vehicle communication system.

Referring to FIG. 2, the vehicle 200 generally includes a controller 210, a receiving unit 220, and a transmitting unit 230. The receiving unit 220 and the transmitting unit 230 are operatively coupled to the controller 210. Persons of ordinary skill in the art will readily appreciate that the receiving unit 220 and the transmitting unit 230 may be separate components or integrated into a single component. For example, the receiving unit 220 and the transmitting unit 230 may be integrated into a single transceiver unit operable to transmit and receive data, which may include voice, graphics, video, text, numeric data and the like, to and from a wireless communication system.

During registration, the notification server 100 may retrieve information associated with the detection capability of the vehicle 200, i.e., the trigger event(s) that the vehicle 200 may employ during operation of the vehicle, such as low fuel indication and maintenance reminders. Persons of ordinary skill in the art will readily appreciate that the notification server 100 may retrieve such information in many ways. For example, the notification server 100 may directly query the vehicle 200 via a wireless network for its detection capability. Alternatively, the notification server 100 may access the website for the vehicle's manufacturer and download the detection capability information via the Internet, i.e., from a server of the vehicle's manufacturer.

Figure 3:
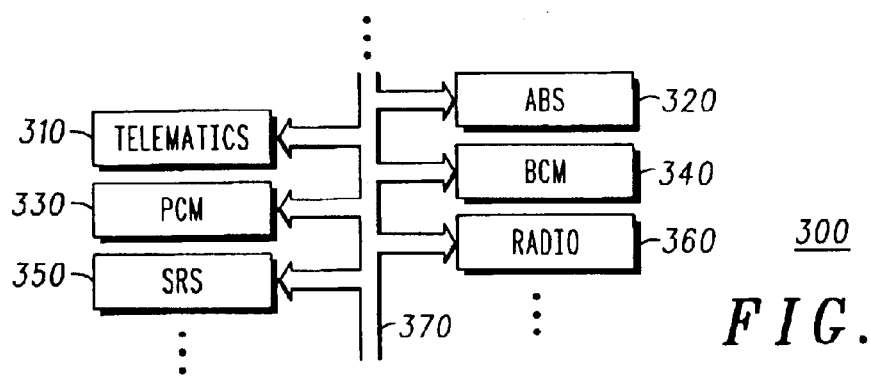
FIG. 3 is a block diagram of a vehicle control and information management system.

The controller 210 of the vehicle 200 is operable to monitor for the specified events. The controller 210 may include a plurality of control modules 300 (shown in FIG. 3) such as, but not limited to, a telematics control module 310, an anti-brake system (ABS) control module 320, a powertrain control module (PCM) 330, a body control module (BCM) 340, a supplemental restraint system (SRS) control module 350, and a radio control module 360, as persons of ordinary skill in the art will readily recognize. The plurality of control modules 300 may be operatively coupled together via a communication bus 370 or a packet data network (not shown). The plurality of control modules 300 may be operable to monitor for the specified events and to in addition to providing any in-vehicle notification, also provide notification of the event to the notification server 100. The plurality of control modules 300 may be further operable to determine the vehicle location. Vehicle location may be determined using Global Positioning System (GPS) or other satellite based location technologies, or using signals received from cellular telephone base stations using, for example, time-of-arrival (TOA) estimates.

Upon detection of a specified event by one of the plurality of control modules 300 as described above, the vehicle 200 (e.g., via the telematics control module 310 and the transmitting unit 230) may transmit a maintenance notification to the notification server 100 via a wireless communication network such as network 120. In particular, the wireless communication network may be one of a code division multiple access (CDMA) based communication protocol, a time division multiple access (TDMA) based communication protocol, a global system for mobile communication (GSM) based communication protocol, a Bluetooth based communication protocol, an Institute of Electrical and Electronics Engineers (IEEE) 802.11 based communication protocol, a multimedia message service (MMS) communication protocol, a short-message service (SMS) communication protocol, and an Infrared Data Association (IrDA) based communication protocol. With a Bluetooth based communication protocol, for example, the vehicle 200 may transmit the maintenance notification directly to a users pager, cellular phone, personal digital assistant or other such device at the direction of the notification server 100. Alternatively, the vehicle 200 may transmit the maintenance notification to the notification server 100, which in turn communicates the notification to the user via the user specified preferred alert media.

Figure 4:
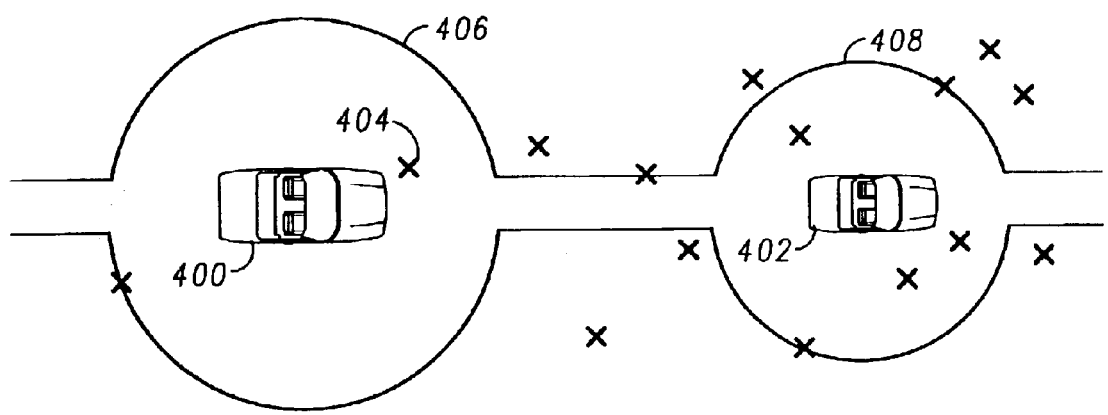
FIG. 4 is schematic representation of a user relative to a zone of service availability based upon a threshold value.
Figure 5:
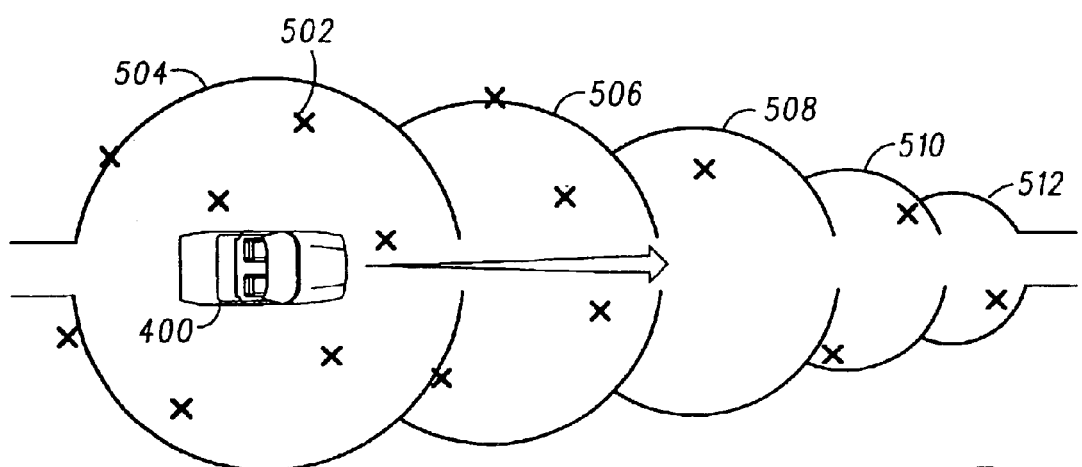
FIG. 5 is a schematic representation of a user relative to a predictive zone of service availability based upon a dynamic threshold value.

Aspects of the disclosure are illustrated by the examples set forth in FIGS. 4–5. Referring to FIG. 4, users, motor vehicles 400 and 402 are operating within a geographic region in which there are located several service stations, one of which is identified as service station 404. Associated with each vehicle 400 and 402 is a zone of interest 406 and 408, respectively, that relates to the range of their vehicle with its then currently available gasoline in its tank. The relative size of the zones of interest 406 and 408 suggests that the vehicle 400 is capable of traveling farther, i.e., has a larger range, than the vehicle 402 for the given amount of gasoline available, the average kilometers-per-liter (KPL) and current driving conditions. The average KPL may be an instantaneous average communicated by the vehicle to the notification server 100 or an average KPL for the given vehicle type. The driving conditions may take into account weather, traffic delays and type of driving such as highway or city driving.

While the vehicle 400 has a greater range, there are fewer service stations 404 proximate, to it and within its associated zone of interest 406. Therefore, an alert is provided to the user of the vehicle 400. The alert may be provided through an on-board telematics system, such as a navigation system, or the alert may be provided by page or cellular telephone call. The type of alert may be specified by the user during registration and may be retained within the user profile. The user may also be requested to acknowledge the alert, and the notification server 100 may employ an alert escalation scheme. That is, the first alert may be a subtle notification via an in-vehicle indicator (not depicted). If the user does not acknowledge the alert, subsequent alerts may by made such as by increasing the intensity of the in-vehicle indication, sending a page message or alerting the user's cellular telephone. The alert may inform the user of the current predicted range of the vehicle 400 and the locations of service stations 404 relative to the vehicle.

While vehicle 402 has less range than vehicle 400, there are substantially more service stations 404 proximate to the vehicle. Thus, the notification server 100 does not alert the user of vehicle 402. Therefore, the threshold used by the notification server 100 is related to the number of service stations within a predicted range of the vehicle. The uses of vehicles 400 and 402 may be similarly notified if the on-board vehicle management systems predict a need for maintenance within a given number of miles. While both vehicles may require service within a similar number of miles, each may not receive notifications depending on the availability of service. The delivery of the alert may further take into account time in order to advise the user that the nearest service station closes within "X" minutes, that estimated travel time may exceed "X" minutes and advise the user of alternate routes or to otherwise hurry.

FIG. 5 provides an additional example illustrative of the disclosure. The vehicle 500 is operating in a geographic region in which there are located service stations, one of which is identified as service station 502. The vehicle is traveling in a particular direction, at a particular speed and has a consumption rate of gasoline. The notification server 100 may thus calculate dynamically the zones of interest 504–512 for the vehicle 500 as it proceeds on its trip. As gasoline is consumed, the zone of interest decreases in size, and the number of service stations 502 captured within the any particular zone of interest decreases. The spacing of the zones of interest 504–512 is done for clarity, as in theory the vehicle would not be able to exceed the range of the initial zone of interest 504 given the available fuel and traveling conditions. Alternatively, subsequent zones of interest may be smaller in size due to a dearth of available services and hence an increased urgency to obtain service.

The notification server 100 may then determine, i.e., predict when and where an alert is likely to be generated. The notification server 100 may thus take into account when to provide the alert given vehicle operating conditions, location, location of available services and user preference. That is, the notification server 100 may dynamically determine a threshold for the alert based upon a user's need for a service, a location of the user and an availability of the desired/required service relative to the user. The alert may also then take into account other potentially desired services, such as hotel/motel or restaurants of a preferred type.

Various methods may be used to predict future locations. Simply, the user location may be predicted by extrapolation based on current direction/speed, navigation system plans, regular/repeated transit paths or destination information from a meeting maker/electronic organizer application. The notification server 100 may survey the future possible positions of the user to determine service supply characteristics.

Figure 6:
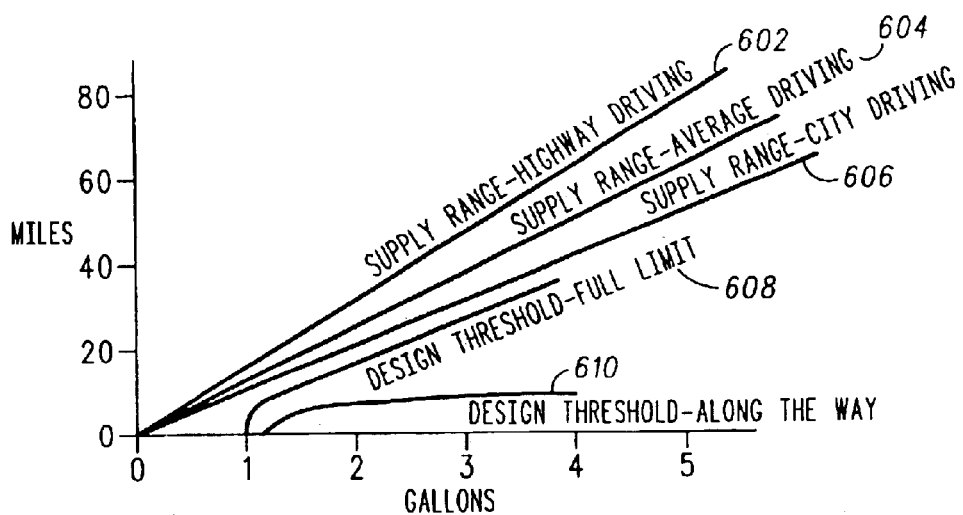
FIG. 6 graphically illustrates thresholds.

The chart 600 illustrated in FIG. 6 shows the differences between a simple range limit for supply (linear miles for gasoline) for highway driving conditions 602, average driving conditions 604 and city driving conditions 606. The curve 608 illustrates a threshold that could be used if the supply source was to be located anywhere within the range of the vehicle, i.e., if the user is willing to drive in any direction to obtain service. The curve 610 illustrates a threshold that could be used if the user has an intended destination and does not want to go too far out of the way of this intended destination to obtain service. The curves 602-610 may be used to set the search diameter for a given projected amount of available fuel. It should be noted that the threshold curves 608 and 610 end at a given value of available fuel (shown as approximately 4 gallons in the FIG. 6). It is reasonable to expect that there is no urgency of notification at some point, and in this example, the notification server 100 would not even begin to evaluate locations of service stations and vehicle range unless the fuel supply falls below this level.

Figure 7:
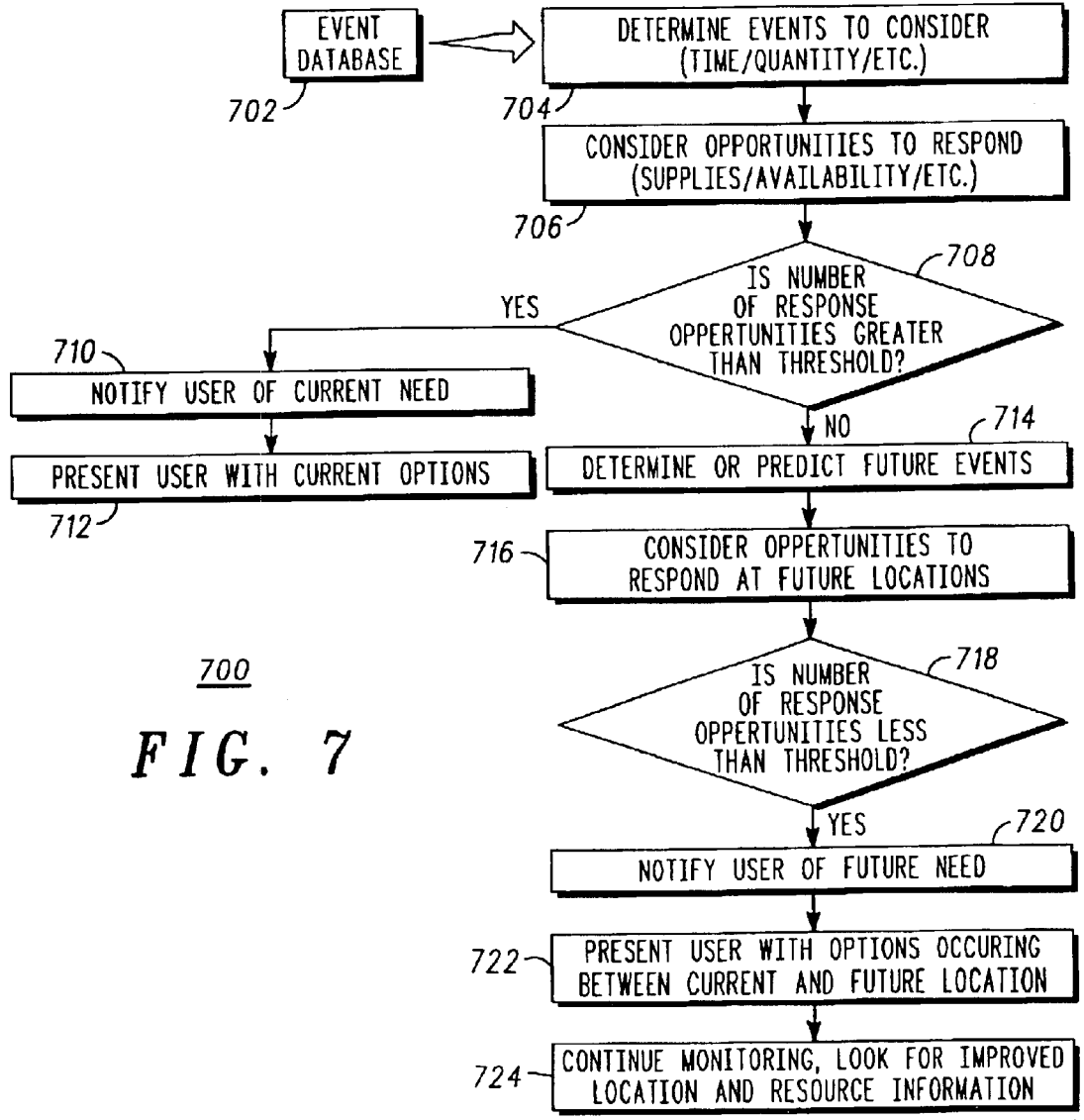
FIG. 7 is a flow diagram illustrating a method of service notification based upon thresholds.

Referring to FIG. 7, a method 700 of service notification based upon thresholds is shown. The method 700 may be implemented within the notification server 100. Event data is provided 702, which is considered relative to various parameters such as time, quality, etc. to determine events of current interest 704. Opportunities are then considered 706 that may be responsive to the events. For example, the notification server 100 may conduct a search of the Internet to identify services/opportunities that may be of interest to the user as well as that may be responsive to the events. If the number of services/opportunities is less than the threshold criteria 708, a notification is provided to the user 710 and the user is provided with a list of current options 712.

If the number of services/opportunities is not less than the threshold criteria 708, the notification server 100 may determine or predict future events 714 and locations of services/opportunities to respond to the future events 716. If the number of services/opportunities is less than the threshold criteria 718, a notification is provided to the user 720 and the user is provided with a list of options between the current location and the future location 722. The notification server 100 may the continue to evaluate improved services/opportunities 724.

In the foregoing specification the present patent has been described with reference to specific embodiments. However, one of ordinary skill in the art will appreciate that various modifications and changes can be made to these embodiments without departing from the scope of the present patent as set forth in the claims below. The system may be adapted to operate with a household appliance such as a refrigerator. Should the refrigerator detect the onset of a failure in one of its components or a need for service, it may consider the day of the week and the time of day such that the user may be alerted during a time when service is available and before the failure of the component or the need for service.

The system and method described herein may be adapted to reside on a cellular telephone or other handheld user device. The cellular telephone may be adapted with a wireless Bluetooth or similar communication technology which can poll a user's vehicle for current data, for example fuel level, speed and fuel consumption. The system and method resident on the cellular telephone may then determine a need for services and a location of service opportunities relative a threshold. If appropriate, the cellular telephone may then provide an alert to the user.

Accordingly, the specification and figures are to be regarded in an illustrative rather than in a restrictive sense, and all such modifications are intended to be included within the scope of the present patent.

I claim:

1. A method of communicating the availability of a service to a potential consumer of the service, the method comprising:

determining a zone of interest, the zone of interest being based at least upon a current location of the potential consumer and a predicted mobility of the potential consumer;

determining an availability of the service within the zone of interest; and generating an alert to the potential consumer of the service, the alert being based upon a level of the availability of the service within the zone of interest and a settable threshold, the settable threshold being established in advance by the potential consumer of the service;

periodically recalculating the zone of interest to provide a recalculated zone of interest, determining the availability of the service within the recalculated zone of interest; and generating an alert to the potential consumer of the service, the alert being based upon a level of the availability of the service within the recalculated zone of interest and the settable threshold.

2. The method of claim 1, wherein determining an availability of the service within the zone of interest comprises quantitatively determining the availability of the service within the zone of interest; and wherein the alert is based upon a level of the availability of the service of a predetermined quantity within the zone of interest and the settable threshold.

3. The method of claim 1, wherein determining an availability of the service within the zone of interest comprises qualitatively determining the availability of the service within the zone of interest; and wherein the alert is based upon a level of the availability of the service of a predetermined quality within the zone of interest and the settable threshold.

4. The method of claim 1, wherein the zone of interest is at least one of temporally and geographically based.

5. The method of claim 1, comprising:

predicting a future location of the potential consumer;

determining a future zone of interest, the future zone of interest being based at least upon the future location of the potential consumer;

determining an availability of the service within the future zone of interest; and generating an alert to the potential consumer of the service, the alert being based upon a level of the availability of the service within the future zone of interest and the settable threshold.

6. The method of claim 1, wherein the alert has an alert intensity, the intensity being based upon the level of the availability of the service within the zone of interest.

7. The method of claim 6, wherein the alert intensity is inversely proportional to the level of the availability of the service within the zone of interest.

8. The method of claim 1, comprising, upon generating an alert, determining an availability of an additional service and alerting the potential consumer as to the availability of the additional service.

9. A method of communicating the availability of a service to a potential consumer of the service, the method comprising:

determining a zone of interest, the zone of interest being based at least upon a current location of the potential consumer and a predicted mobility of the potential consumer;

determining an availability of the service within the zone of interest; and generating an alert to the potential consumer of the service, the alert being based upon a level of the availability of the service within the zone of interest and a settable threshold, the settable threshold being established in advance by the potential consumer of the service;

determining a dynamic threshold, the dynamic threshold being based upon a predicted need for the service by the consumer; and generating an alert to the potential consumer of the service, the alert being based upon a level of the availability of the service within the zone of interest and the dynamic threshold.

10. A method of communicating the availability of a service to a potential consumer of the service, the method comprising:

determining a zone of interest, the zone of interest being based at least upon a current location of the potential consumer and a predicted mobility of the potential consumer, the predicted mobility being based upon at least one of traveling conditions and intended destination;

determining an availability of the service within the zone of interest; and generating an alert to the potential consumer of the service, the alert being based upon a level of the availability of the service within the zone of interest and a settable threshold, the settable threshold being established in advance by the potential consumer of the service.

11. A service notification system comprising:

a notification server;

a database coupled to the notification server, the database including service threshold information being associated with a potential consumer of a service;

the notification server being operable to determine a zone of interest, the zone of interest being based upon a current location of the potential consumer and a predicted mobility of the potential consumer, and to determine an availability of the service within the zone of interest in order to numerate an alert to the potential consumer based noon a level of the availability of the service within the zone of interest and the consumer settable threshold information, and to periodically recalculate the zone of interest to provide a recalculated zone of interest, to determine an availability of the service within the recalculated zone of interest; and to generate an alert to the potential consumer of the service, the alert being based upon a level of the availability of the service within the recalculated zone of interest and the consumer settable threshold information.

12. The service notification system of claim 11, wherein the availability of the service is based upon a quantity of the service being available within the zone of interest; and wherein the alert is based upon a level of the availability of service of a predetermined quantity within the zone of interest and the settable threshold.

13. The service notification system of claim 11, wherein the availability of the service is based upon a quality or the service being available within the zone of interest; and wherein the alert is based upon a level of the availability of service of a predetermined quality within the zone of interest and the settable threshold.

14. The service notification system of claim 11, wherein the zone of interest is at least one of temporally and geographically based.

15. The service notification claim 11, the notification server being operable to predict a future location of the potential consumer; to determine a future zone of interest, the future zone of interest being based at least upon the future location of the potential consumer; to determine an availability of the service within the future zone of interest; and to generate an alert to the potential consumer, the alert being based upon a level of the availability of the service within the future zone of interest and the threshold information.

16. The service notification system of claim 11, wherein the alert has an alert intensity, the intensity being based upon the level of the availability of the service within the zone of interest.

17. The service notification system of claim 11, wherein the alert intensity is inversely proportional to the level of the availability of the service within the zone of interest.

18. The service notification system of claim 11, the notification server being operable upon generating an alert to determine an availability of an additional service and to alert the potential consumer as to the availability of the additional service.

19. A service notification system comprising:

a notification server;

a database coupled to the notification server, the database including service availability information and consumer settable threshold information, the consumer settable threshold information being associated with a potential consumer of a service;

the notification server being operable to determine a zone of interest, the zone of interest being based upon a current location of the potential consumer and a predicted mobility of the potential consumer, and to determine an availability of the service within the zone of interest in order to generate an alert to the potential consumer based upon a level of the availability of the service within the zone of interest and the consumer settable threshold information, and to determine a dynamic threshold, the dynamic threshold being based upon a predicted need for the service by the potential consumer; and to generate an alert to the potential consumer, the alert being based upon the level of the availability of the service within the zone of interest and the dynamic threshold.

20. A service notification system comprising:

a notification server;

a database coupled to the notification server, the database including service availability information and consumer settable threshold information, the consumer settable threshold information being associated with a potential consumer of a service;

the notification server being operable to determine a zone of interest, the zone of interest being based upon a current location of the potential consumer and a predicted mobility of the potential consumer, the predicted mobility being based upon at least one of traveling conditions and intended destination and to determine an availability of the service within the zone of interest in order to generate an alert to the potential consumer based upon a level of the availability of the service within the zone of interest and the consumer settable threshold information.

* * * * *